United States Patent [19]

Sisson

[11] 3,874,651
[45] Apr. 1, 1975

[54] IMPROVED REGISTRATION EDGE FOR AUTOMATIC DOCUMENT HANDLER

[75] Inventor: Jeffery L. Sisson, Macedon, N.Y.

[73] Assignee: Xerox Corporation, Stamford, Conn.

[22] Filed: Apr. 26, 1974

[21] Appl. No.: 464,395

[52] U.S. Cl. .................................. 271/4, 271/233
[51] Int. Cl. ............................................. B65h 9/06
[58] Field of Search .............. 271/4, 233, 3, 5, 6, 7, 271/10, DIG. 9, 226, 245, 246, 243, 244, 272–277

[56] References Cited
UNITED STATES PATENTS 3,790,158  2/1974  Summers et al. ...................... 271/4

Primary Examiner—Evon C. Blunk
Assistant Examiner—Bruce H. Stoner, Jr.

[57] ABSTRACT

An automatic document handler for supplying and removing documents from the platen of a processing apparatus such as a copying machine. The document handler includes a register against which the document trailing edge is abutted through reversal of a platen transport belt for positioning the document on the platen. To prevent the document from overriding the registration edge as the platen belt is reversed to drive the document against the registration edge, an angled registration edge is provided to strip the document from the belt and provide a self-sharpening edge through the interaction of the belt with the edge.

3 Claims, 3 Drawing Figures

IMPROVED REGISTRATION EDGE FOR AUTOMATIC DOCUMENT HANDLER

BACKGROUND OF THE INVENTION

With the advent of high speed copiers, such as xerographic reproduction machines, automatic document handlers are required to rapidly place and remove documents from the platen of the copy machine to enable the machine to produce copies at its full potential. The document handler must first separate the document to be copied from others awaiting copying. Following this, the document must be brought into position on the machine platen and located in a certain position to assure the making of a complete and visually acceptable copy. One of the common ways for moving a document onto the platen of the copy machine involves the utilization of a single large platen belt which rides against or in proximity to the glass to move the document onto the glass, after which it is reversed to drive the document against a suitable registration edge for accurately positioning the document on the platen. Due to the constant frictional engagement between the documents, the platen glass, and the platen belt, a certain amount of static electricity may be built up in the various elements which may result in the document adhering to the platen belt. When the platen belt is thereafter reversed to drive the document against the registration edge, the electrostatic force holding the document on the belt may be sufficient to pull the document up over the registration edge, preventing proper registration of the document on the platen. This problem is aggravated by the fact that as the belt continuously rides over the registration edge, the upper corner thereof is quickly rounded off, thereby increasing the tendency of the document to be carried over the registration edge as the belt is reversed to register the document.

SUMMARY OF THE INVENTION

This invention relates to an apparatus for feeding documents to an automatic copying machine including a transport belt adapted for cooperation with the platen of the copy machine for moving documents onto and off of the platen. A register edge movable into and out of the document path is adapted for movement into the document path after the document is placed on the platen. The platen is then reversed to force the document against the registration edge for proper positioning of the document on the platen. The registration edge is disposed at an angle relative to the platen glass within a range of 79°–84° to provide for improved stripping of the documents from the platen belt as the same is reversed for registration and to provide a self-sharpening effect to maintain a sharp edged corner on the registration edge as the registration edge is worn down by the continual scrubbing of the belt over the top portion thereof.

DESCRIPTION OF THE PREFERRED EMBODIMENT

Figure 1:
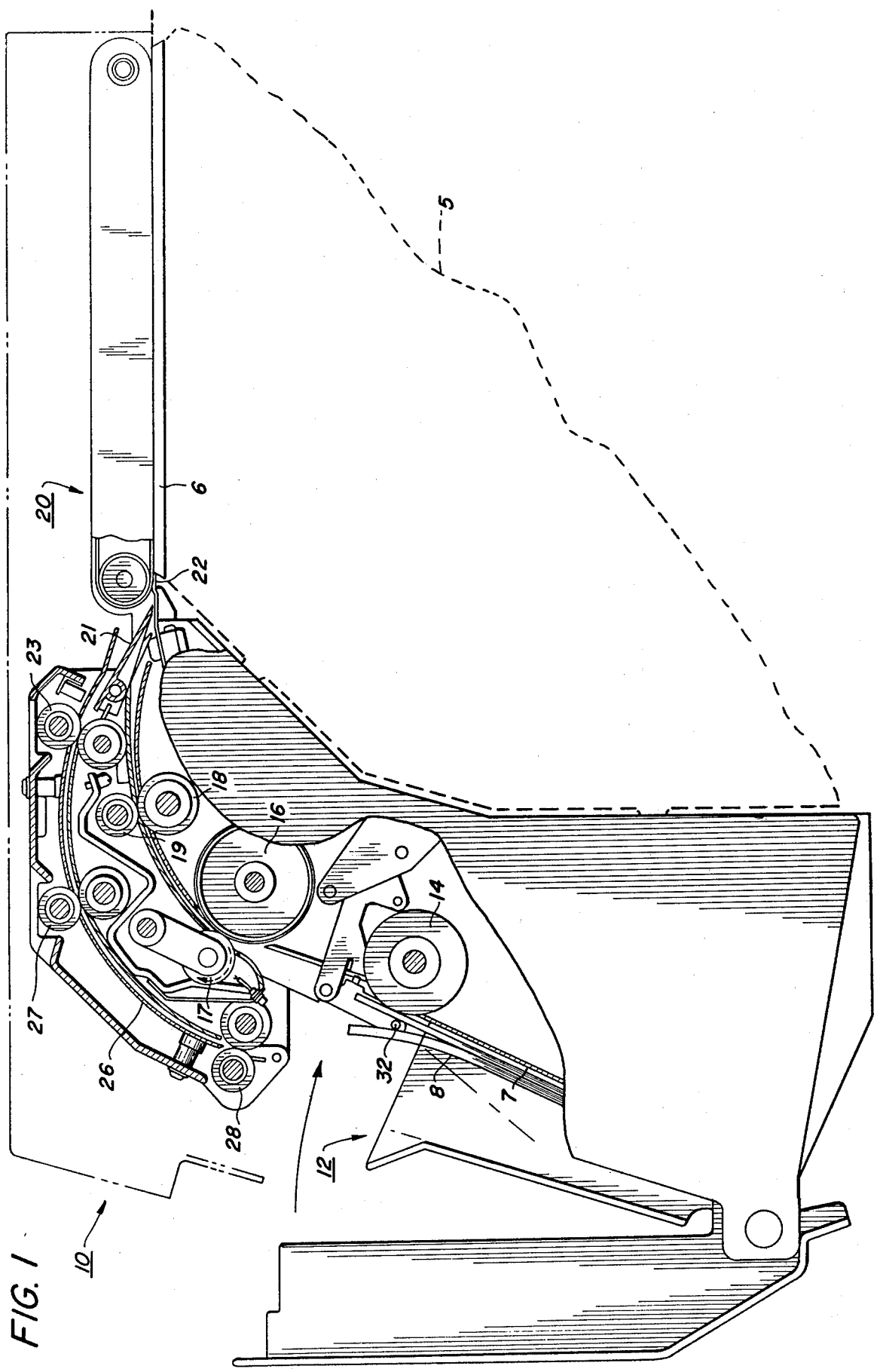
FIG. 1 is a side view in cross section showing a document handler incorporating the improved document registration edge of the present invention in operative association with a document copying machine.

Referring to the drawings, there is shown a document handler designated generally by the numeral 10 incorporating the platen transport of the present invention. Document handler 10 may be used with any suitable document processing apparatus, such as a reproduction machine 5, which has a platen 6 on which the document to be copied is placed. Document handling apparatus 10 includes a supply tray 12 for storing both documents 7 to be copied and documents 8 already copied. From tray 12, one document at a time is advanced from the bottom of supply 7 by an intermittently operated primary feed roll 14 into the nip of retard roll pair 16, 17. The lower roll 16 is driven in a document feeding direction while the upper roll 17 is driven in the reverse or document reject direction (as shown by the dotted line arrow in FIG. 1) through a suitable slip coupling which normally enables the lower roll 16 to override the reverse drive input to roll 17 and thereby turn roll 17 in the document feeding direction. However, if two or more documents enter the nip of roll pair 16, 17, the reduced friction between the overlapping documents reduces the frictional drive force between roll pair 16, 17, permitting the slip clutch to engage and drive roll 17 in the reverse, document rejecting direction.

The document emerging from retard roll pair 16, 17 passes into the nip of intermediate roll pair 18, 19, and from there underneath deflector plate 21 to platen transport 20. Transport 20, which comprises a belt-type conveyor, first carries the document forward onto platen 6 until the entire document is positioned thereon. Transport 20 is then reversed to bring the document trailing edge against register 22. Register 22 locates the document in copying position following which the copy or copies are made by the copying apparatus 5.

When copying is completed, platen transport 20 is again started in reverse to move the document backwards off platen 6, register edge 22 being previously retracted for this purpose. Deflector 21, which was previously lowered, guides the returning document upwardly into the nip of return roll pair 23. Roll pair 23 move the document along suitable return guides 26 through second and third return roll pairs 27, 28 respectively, and back into tray 12.

To maintain copied documents which have been designated for convenience by the numeral 8, segregated from documents 7 awaiting copying, and prevent inadvertent or premature refeeding of the returned documents 8 by feed roll 14 following feed of the last one of the documents 7, a displaceable bail or separator bar 32 is provided. Bail 32 is disposed substantially opposite to and above primary feed roll 14 to prevent documents resting thereon from contacting roll 14. Bail 32 may be reset onto the top of the documents in tray 12 when it is desired to refeed the documents to copying machine 5. For a complete description of mechanisms suitable for moving the bail bar 32, register 22 and deflector 21, reference may be had to U.S. Pat. application Ser. No. 250,905.

Figure 2:
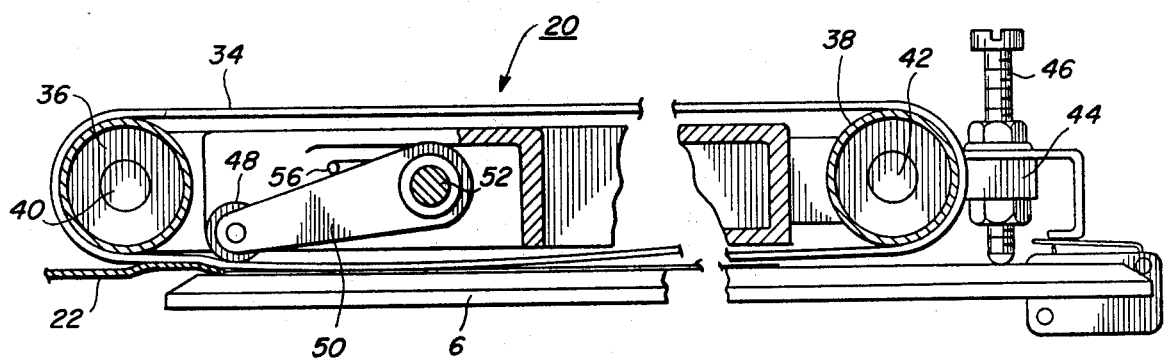
FIG. 2 is a side view showing the document transport belt with the improved registration edge for stripping documents from the platen belt when the platen belt is reversed for registering documents against the registration edge.
Figure 3:
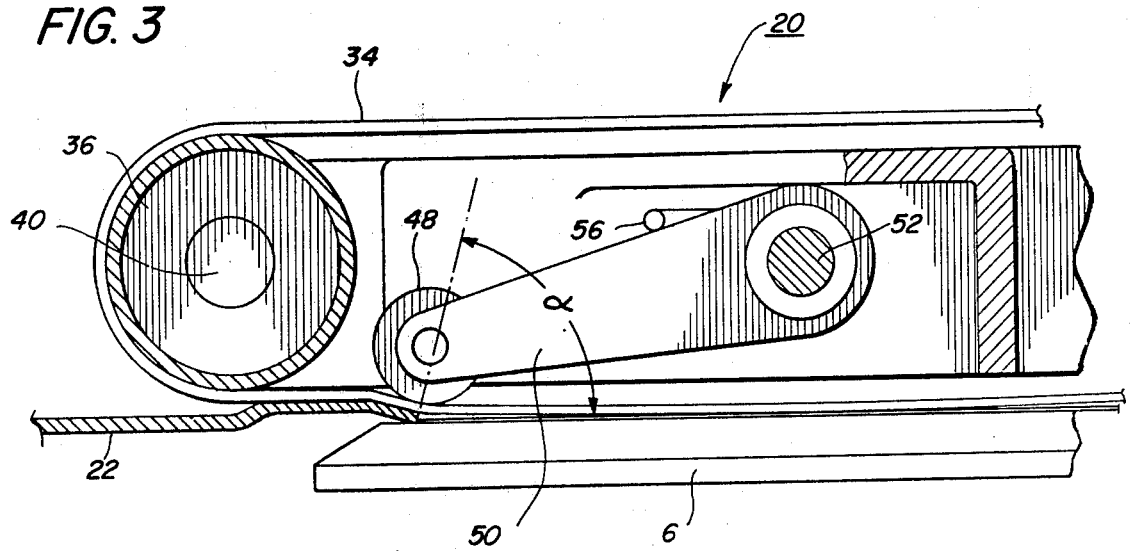
FIG. 3 is an enlarged partial view of the device of FIG. 2 illustrating the relationship between the registration edge, the platen glass, and the platen transport belt to provide improved document stripping and prevent rounding off of the registration edge.

Referring particularly to FIGS. 2 and 3 of the drawings, platen transport 20 consists of an endless, flexible belt 34, the outer surface of which is light reflective. One such belt construction is disclosed in U.S. Pat. No. 3,482,676 to G. E. Fackler. Platen belt 34 is stretched about drive and idler roll pair 36 and 38 respectively, rolls 36 and 38 being arranged on opposite sides of platen 6 with the axis of roll 36 being above register 22 while that of roll 38 is above the far side of platen 6. Roll shafts 40 and 42 are rotatably supported in sides (not shown) of the platen transport 20. The sides each carry a projection 44 adjacent idler roll 38 for receiving adjustable stop screws 46 therein. The stops 46 may be adjusted to provide the required spacing of the platen belt above the surface of the platen. The dimension and mounting of the belt supporting roll pair 36, 38 and the adjustment of screw 46 is such that the surface of platen transport belt 34 therearound is spaced slightly above the level of platen 6 as seen in FIGS. 2 and 3. An internal pressure roll 48 is provided, roll 48 engaging belt 34 proximate the inlet to platen 6 to force the belt 34 against register 22 when register 22 is in the up position. By reference to FIGS. 2 and 3, it can be seen that the register edge is disposed such as to provide an included angle $\alpha$ between the register edge surface and the platen glass within the range of 79°–84°. This critical angle provides a "knife" portion at the top of the registration edge which acts in much the same manner as stripper fingers to positively separate the document which may be adherent to the platen belt due to static electrical forces existent thereon and force the document against the registration edge rather than allow the document to be carried over the registration edge as may occur if the registration edge is disposed at an angle of 90° to the platen glass. Due to the angle on the registration edge, as the belt scrubs over the top surface thereof, the top corner of the registration edge is not rounded off thereby but is continuously sharpened to provide optimum stripping of the document irrespective of the wear on the registration edge. Should the included angle be greater than 84°, the desired sharp edge would not be present on the register edge when the register edge is new nor would the register edge be self-sharpening since an angle greater than 84° would allow the register edge to round off instead of sharpen. In the event that an included angle less than 79° is used, the documents being forced against the register edge may be forced under the registration edge due to the increased angularity of the register edge. Further, when the included angle is less than 79°, if documents strike the sharp registration edge at a skewed angle, the document may wrinkle or tear instead of straightening out as desired. Therefore, the range of the included angle for the disclosed registration edge must be within a range of 79°–84° to provide optimum stripping and self-sharpening of the registration edge.

While I have described a preferred embodiment of my invention, it is to be understood that the invention is not limited thereto but may be otherwise embodied within the scope of the following claims.

What is claimed is:

1. In a document handling apparatus for moving documents into copying position on the platen of a document copying machine, the combination of:
   a flexible document transport belt;
   a pair of interior support rolls about which said belt is operatively disposed, said support rolls being spaced apart to support said transport belt opposite to and extending across at least a portion of said platen; and,
   a register having an edge portion thereon movable into and out of the document path, said register being movable into the document path after a document is removed from the platen, movement of the document over said register edge onto the platen and subsequent reversal of the transport belt causing the document to be forced against the edge portion of said register and properly located on the platen, movement of the register out of the document path and operation of the transport belt in the reverse direction causing the document to be moved off of the platen, the edge portion of said register forming an included angle in the range of 79°–84° with the platen to provide a knife-like portion along the top of the register edge for stripping documents from said belt when said belt is reversed for forcing the document against said register, movement of said belt against said register causing said knife-like portion to be constantly sharpened thereby during operation of the document handling apparatus.

2. In a document handling apparatus for moving documents into copying position on the platen of a document copying machine, the combination of:
   register means associated with the platen for aligning documents placed on the platen against an edge of said register means, said edge being formed to provide an included angle with the platen in the range of 79°–84° to provide a knife-like portion on said edge; and,
   document feed means adapted for contact with said register means for moving documents therebetween onto the platen and against said register means, the top portion of said register edge being constantly sharpened by relative movement between said document feed means and said register means to prevent rounding-off of the top portion of the register edge.

3. The apparatus of claim 2 wherein said document feed means is adapted for movement in a first direction for feeding documents onto the platen of the copy machine, reversal of said document feed means causing the document to be forced against said register edge and properly located on the platen, said register means being movable into and out of the path of movement of the documents, movement of the registration means out of the document path and operation of the document feed means in the reverse direction causing the document to be fed off of the platen.

* * * * *